(12) United States Patent
Murakami et al.

(10) Patent No.: US 8,663,573 B2
(45) Date of Patent: Mar. 4, 2014

(54) APPARATUS FOR PRODUCING TRICHLOROSILANE AND METHOD FOR PRODUCING TRICHLOROSILANE

(75) Inventors: Naoya Murakami, Naka-gun (JP); Wataru Saiki, Hitachinaka (JP)

(73) Assignee: Mitsubishi Materials Corporation, Tokyo (JP)

( * ) Notice: Subject to any disclaimer, the term of this patent is extended or adjusted under 35 U.S.C. 154(b) by 394 days.

(21) Appl. No.: 12/929,789

(22) Filed: Feb. 16, 2011

(65) Prior Publication Data
US 2011/0200510 A1   Aug. 18, 2011

(30) Foreign Application Priority Data
Feb. 17, 2010   (JP) ................................. 2010-032999

(51) Int. Cl.
| A62D 3/00 | (2007.01) |
|---|---|
| B01J 19/00 | (2006.01) |
| C01B 33/00 | (2006.01) |
| C01B 33/08 | (2006.01) |

(52) U.S. Cl.
USPC ........... 422/199; 422/129; 423/324; 423/341; 423/342

(58) Field of Classification Search
USPC ........... 422/129, 198, 199; 423/324, 341, 342
See application file for complete search history.

(56) References Cited

U.S. PATENT DOCUMENTS

| 3,541,304 A | 11/1970 | Diter |
|---|---|---|
| 4,233,494 A | 11/1980 | Pawlik et al. |
| 4,536,642 A | 8/1985 | Hamster et al. |
| 5,422,088 A | 6/1995 | Burgie et al. |
| 5,906,799 A | 5/1999 | Burgie et al. |
| 2004/0173597 A1 | 9/2004 | Agrawal et al. |
| 2007/0073075 A1 | 3/2007 | Paetzold et al. |
| 2009/0155140 A1 | 6/2009 | Ishii et al. |
| 2009/0169190 A1 | 7/2009 | Fang et al. |
| 2009/0202404 A1* | 8/2009 | Ishii et al. ..................... 422/198 |

FOREIGN PATENT DOCUMENTS

| EP | 2014618 A1 | | 1/2009 |
|---|---|---|---|
| JP | 57012826 A | * | 1/1982 |
| JP | 2004262753 A | * | 9/2004 |
| JP | 3781439 B2 | * | 5/2006 |
| JP | 2008133170 A | * | 6/2008 |

OTHER PUBLICATIONS

European Search Report dated May 24, 2011, issued for the corresponding European patent application No. 11154722.0.
Office Action dated Dec. 3, 2013, issued for the Chinese patent application No. 201110041339.2 and English translation thereof.

* cited by examiner

*Primary Examiner* — Walter D Griffin
*Assistant Examiner* — Natasha Young
(74) *Attorney, Agent, or Firm* — Edwards Wildman Palmer LLP

(57) ABSTRACT

An apparatus for producing trichlorosilane, including: a reaction vessel that has a substantially cylindrical wall body, a top plate, and a bottom plate, where a reaction product gas is produced from a raw gas supplied to the reaction vessel through a gas introducing passage provided to the lower section of the cylindrical wall body; and a plurality of heaters that are disposed inside the reaction vessel to heat the raw gas, wherein each of the heaters has a heating element that is elongated in a vertical direction and generates heat by electrification, and a mount that is fixed to the bottom plate and supports the heating element; a flange is provided to intermediate height of the heating element such that the flange is arranged upper than the gas introducing passage and is elongated in horizontal direction; and a passage of the raw gas formed between adjacent heaters is narrowed by the flange.

8 Claims, 6 Drawing Sheets

APPARATUS FOR PRODUCING TRICHLOROSILANE AND METHOD FOR PRODUCING TRICHLOROSILANE

BACKGROUND OF THE INVENTION

1. Field of the Invention

The present invention relates to an apparatus for producing trichlorosilane and a method for producing trichlorosilane through conversion of silicon tetrachloride to trichlorosilane.

Priority is claimed on Japanese Patent Application No. 2010-032999, filed Feb. 17, 2010, the content of which is incorporated herein by reference.

2. Description of Related Art

Trichlorosilane ($SiHCl_3$) is used as a raw material for producing silicon (Si). The trichlorosilane can be produced by conversion of silicon tetrachloride ($SiCl_4$) through a reaction of silicon tetrachloride and hydrogen.

Silicon is produced by the reductive reaction and the thermolysis reaction of trichlorosilane shown by the below-described reaction formulae (1) and (2), and trichlorosilane is produced by the conversion reaction shown by the below-described reaction formula (3).

$$SiHCl_3 + H_2 \rightarrow Si + 3HCl \quad (1)$$

$$4SiHCl_3 \rightarrow Si + 3SiCl_4 + 2H_2 \quad (2)$$

$$SiCl_4 + H_2 \rightarrow SiHCl_3 + HCl \quad (3)$$

For example, as an apparatus for producing trichlorosilane, Japanese Patent No. 3781439 proposes a reaction vessel having a reaction chamber of dual structure constituted of an outer chamber and an inner chamber formed by two tubes of concentric alignment, and a heating element disposed to surround an outer circumference of the reaction chamber. In this reaction vessel, the heating element is formed of carbon or the like and constitutes a heating section (heater), and the reaction of a gas in the reaction chamber is caused by heating the reaction chamber from outside by the heat generated in the heating element through energizing of the heating element.

An apparatus disclosed in Japanese Unexamined Patent Application, First Publication No. 2004-262753 has a structure in which a reaction chamber is constituted of an inner tube and outer tube in a concentric alignment, and a heating element (heater) is disposed to surround the reaction chamber.

In an apparatus for producing trichlorosilane proposed in Japanese Unexamined Patent Application, First Publication No. 2008-133170, a reaction chamber is constituted of a plurality of cylindrical walls in a concentric alignment, and circular plates that close the upper side and lower side of spaces formed between the walls, where each of the spaces are communicated continuously, and a heating element is disposed in inner side of the innermost cylindrical wall.

Japanese Examined Patent Application, Second Publication No. S60-49021 discloses an apparatus in which a plurality of pipe-shaped heaters are disposed inside the reaction chamber, and a gas is directly heated in the reaction chamber and within the heaters.

Where an apparatus has a structure as described in Japanese Patent No. 3781439 or in Japanese Unexamined Patent Application, First Publication No. 2004-262753, interior of the reaction chamber is heated by the heating element disposed outside the reaction chamber. In this case, heat from the heating element is radiated not only in the inner radial direction but also in the outer radial direction, resulting in a disadvantage of low heat efficiency.

On the other hand, where an apparatus has a structure as described in Japanese Unexamined Patent Application, First Publication No. 2008-133170, it is possible to heat the gas with higher heat efficiency than that of the apparatus of Japanese Patent No. 3781439 since the heating element is disposed to the central position of the reaction vessel, making it possible to transfer the entire heat radiated in the outer radial direction to the gas. However, since a reaction chamber is formed to surround the outer circumference of the heating element, an increase of the outer diameter of the reaction chamber results in an increase of distance between the heating element and a circumferential portion of a space in the reaction chamber. Therefore, there is a limitation for increasing the size of the apparatus in order to increase the production.

Where an apparatus has a structure as described in Japanese Examined Patent Application, Second Publication No. S60-49021, it is possible to utilize the heat of the heater with high efficiency since the heater is disposed inside the reaction chamber. However, the entire gas is not heated uniformly unless the gas flows uniformly in the reaction chamber and flows in each of the heaters uniformly. Therefore, there is a possibility of reduction of reaction efficiency due to heterogeneous heating of the gas.

Based on the consideration of the above-described problems, an object of the present invention is to provide an apparatus for producing trichlorosilane and a method for producing trichlorosilane that enables heating of supply gas with improved high heat efficiency, that enables increasing the size of the apparatus without reducing the heat efficiency, and that enables mass production of trichlorosilane.

SUMMARY OF THE INVENTION

A first aspect of the present invention is an apparatus for producing trichlorosilane from a raw gas (raw material gas, source gas) that includes silicon tetrachloride and hydrogen, including: a reaction vessel that has a substantially cylindrical wall body, a top plate (top lid) that closes (covers) an upper opening formed by the wall body, and a bottom plate (bottom lid) that closes (covers) a lower opening formed by the wall body, wherein a reaction product gas containing trichlorosilane, hydrogen chloride or the like is produced from the raw gas supplied through a gas introducing passage provided to the lower section of the cylindrical wall body; and a plurality of heaters that are disposed inside the reaction vessel to heat the raw gas, wherein each of the heaters has a heating element that is elongated in a vertical direction and that generates heat upon electrification, and a mount that is fixed to the bottom plate and that supports the heating element; a flange is disposed to an intermediate position (in a height direction) of the heating element of each of the heaters such that the flange is arranged to a position higher (upper) than the gas introducing passage and is elongated (protrudes) in a horizontal direction; and a passage of the raw gas formed between adjacent heaters is narrowed by the flange.

A second aspect of the present invention is a method for producing trichlorosilane from a raw gas including silicon tetrachloride and hydrogen, including directly heating the raw gas while controlling a flow of the raw gas by a plurality of heaters each having a flange in an intermediate position by arranging the heaters such that a heating element of each heater is elongated in the vertical direction along which the raw gas passes through, and a passage of the raw gas formed by adjacent heaters is narrowed by the flange.

According to the above-described apparatus for producing trichlorosilane and a method for producing trichlorosilane, the heaters are disposed inside the reaction chamber. Therefore, a heat of the heater is directly transferred to the gas passing a space around the heater. As a result, it is possible to heat the raw gas with a high heat efficiency. Since the heaters are arranged in the reaction chamber, it is possible to avoid reduction of heat efficiency by arranging the heaters in appropriate positions even when the reaction vessel has a large size.

The above-described apparatus for producing trichlorosilane and a method for producing trichlorosilane include arrangement of a plurality of heaters each having a flange in the heating element. Since the flange disturbs the upwelling flow of the raw gas, an interstitial space between each adjacent pair of heaters is narrowed by the flanges forming a passage for the raw gas. Therefore, the raw gas introduced through the gas introducing passage firstly diffuses in a space lower than the flange and fills the space, and subsequently passes through the interstitial space narrowed by the flanges to the upper space in the chamber. Thus, the flow of raw gas is controlled by the presence of flanges and the raw gas flows uniformly from a lower section to a upper section in the reaction chamber. By this constitution, the raw gas is heated uniformly by the heating element of each heater, and therefore, it is possible to prevent disadvantages such as reduction of reaction efficiency due to heterogeneous heating. Because of the structures of the heaters 20, electric current hardly flows in the flanges 23. Therefore, only small amount of heat is generated in the flanges 23.

In the above-described apparatus for producing trichlorosilane, since numerous heaters stand on the bottom plate of the reaction vessel densely, it is difficult to dispose an additional member such as a dispersing plate. However, since the flange provided to the heating element of each of the heaters functions as a dispersing plate, it is possible to disperse the raw gas effectively without disposing dispersing plates as independent members.

Preferably, in the above-described apparatus for producing trichlorosilane, the heating element has a non-exothermic portion (that generates small amount of heat and is) provided in a lower portion of the heating element and an exothermic portion (that generates a large amount of heat and is) provided in an upper portion of the heating element, and the flange is provided to a position lower than the exothermic portion, wherein a heat generated in the non-exothermic portion is smaller than a heat generated in the exothermic portion. In this case, it is possible to suppress transfer of heat from the exothermic portion to the lower portion thereby preventing heating of a basal portion of the heating element.

Preferably, the flange is provided to a boundary portion between the non-exothermic portion and the exothermic portion. Where the flange is positioned lower than the boundary portion between the non-exothermic portion and the exothermic portion, the gas flow controlled by the flange is not heated until reaching the exothermic portion. That is, the heating element has a useless portion. On the other hand, where the flange is positioned higher than the boundary portion between the non-exothermic portion and the exothermic portion, the exothermic portion is partially in contact with the raw gas before the flow-control. The heat transfer to the raw gas is non-effective in this portion, and heat radiated from the exothermic portion below the flange dissipate to the non-exothermic portion, the mount, and the bottom plate of the vessel.

In the above-described apparatus for producing trichlorosilane, the height of the flange of each of the heating elements may be different from the height of the flange of an adjacent heating element. In this case, it is possible to suppress the possibility of an occurrence of short-circuit between flanges adjacent to each other.

In the above-described apparatus for producing trichlorosilane, each of the heating elements may has a plurality of flanges at different heights. In this case, it is possible to achieve a higher effect of controlling the gas flow. The heights of flanges in each of the heating elements may be different from the heights of flanges of adjacent heating element. In this case, it is possible to suppress the possibility of an occurrence of short-circuit between flanges adjacent to each other.

According to an apparatus for producing trichlorosilane and a method for producing trichlorosilane according to the present invention, heaters are disposed inside the reaction chamber. By this constitution, it is possible to transfer heat from the heater to the raw gas directly and heat the raw gas with high heat efficiency, thereby improving the conversion rate to the trichlorosilane. Even when the reaction vessel is made to have a large size, it is possible to avoid reduction of heat efficiency by disposing the heaters at appropriate positions. Therefore, it is possible to increase the size of the apparatus while avoiding a reduction of heat efficiency, thereby enabling mass production of trichlorosilane.

Since a passage for raw gas is formed between the flanges disposed to the heating elements of the heaters, it is possible to disperse the raw gas uniformly through the passage in the reaction chamber, thereby heating the raw gas uniformly, and achieving high heat efficiency.

DETAILED DESCRIPTION OF THE INVENTION

In the following, an embodiment of an apparatus for producing trichlorosilane is explained.

Figure 1:
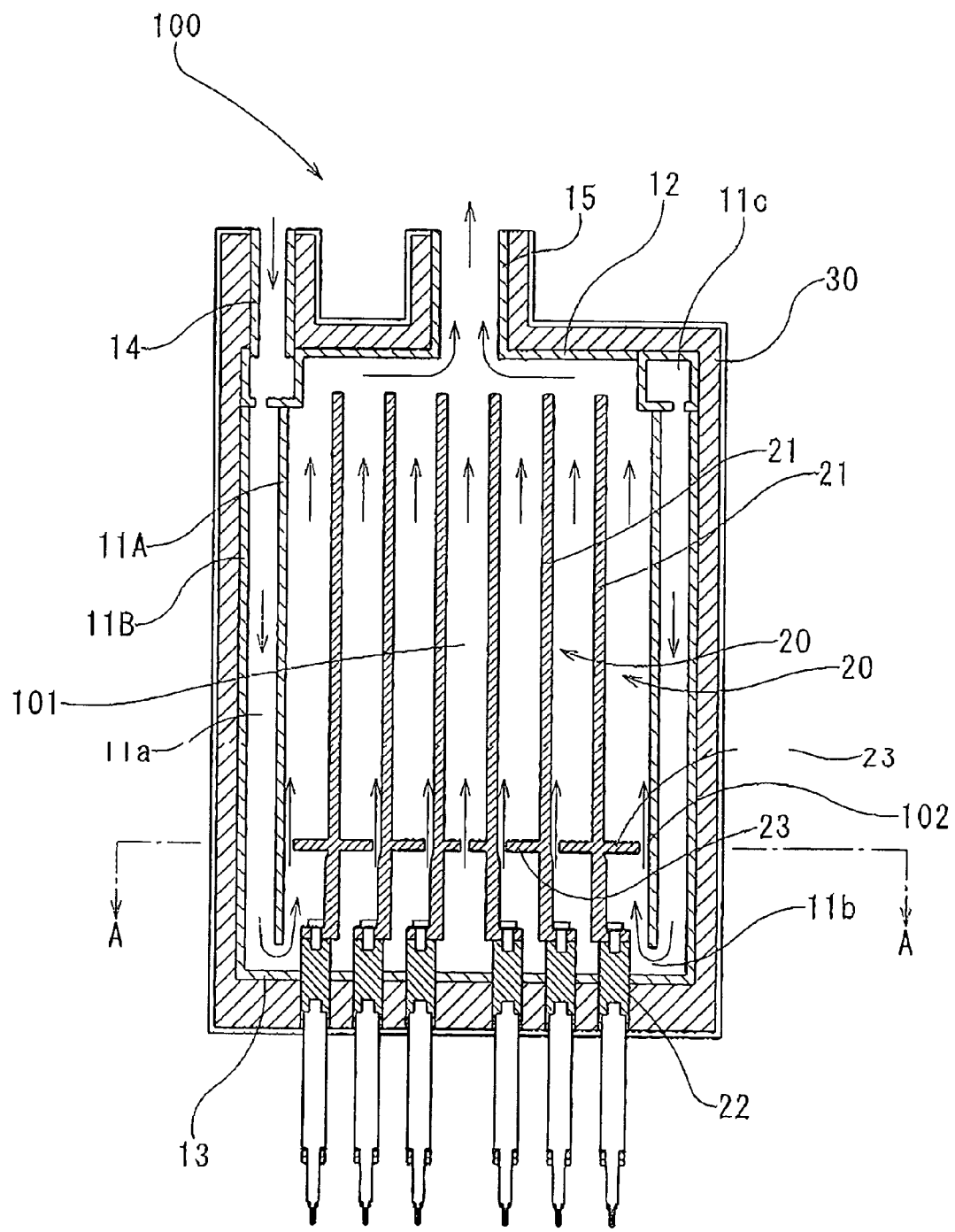
FIG. 1 is a vertical cross-sectional view showing an apparatus for producing trichlorosilane according to the present invention.
Figure 2:
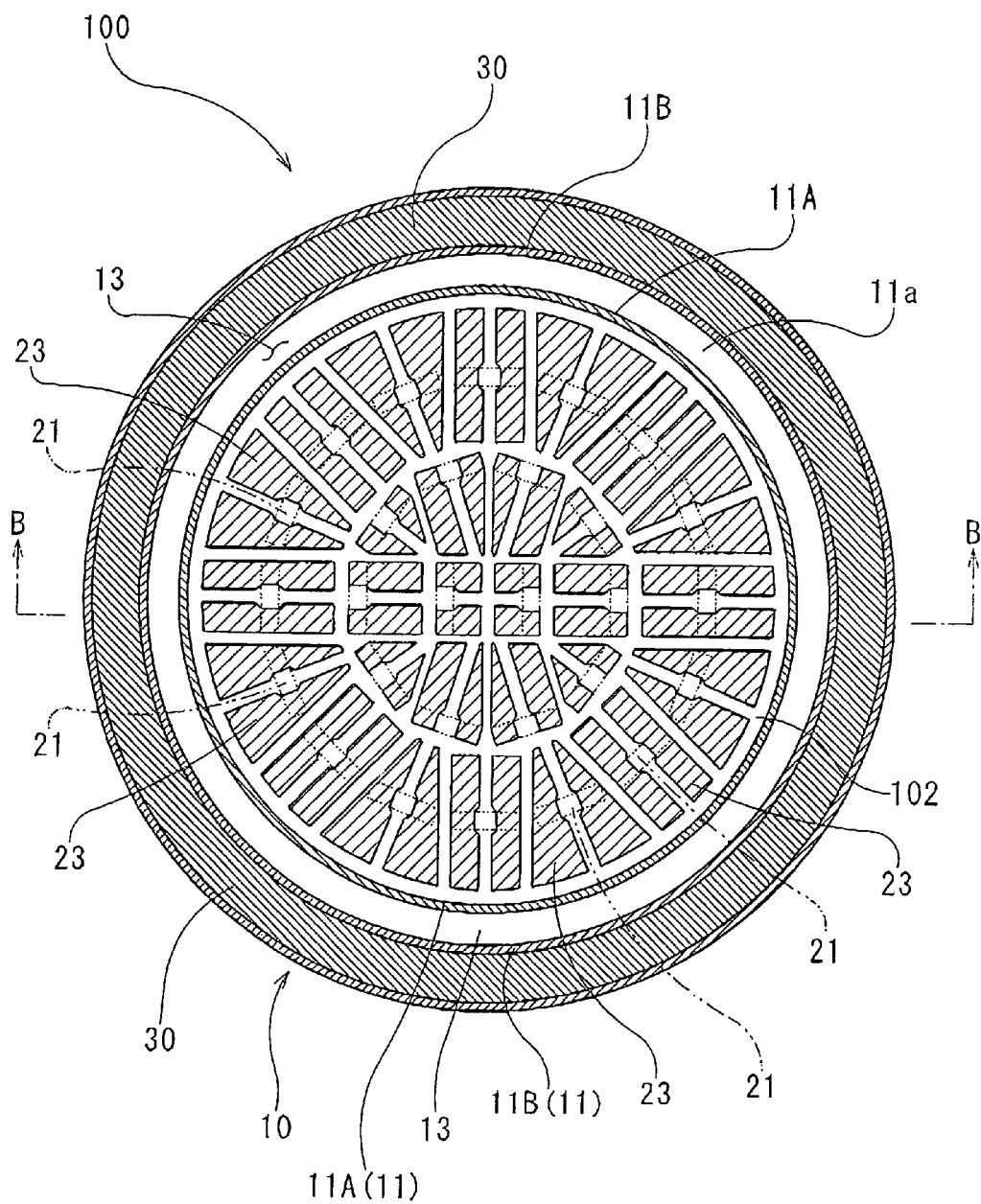
FIG. 2 is a horizontal cross-sectional view of the apparatus for producing trichlorosilane, sectioned at a level of A-A line shown in FIG. 1.

An apparatus for producing trichlorosilane 100 of the present embodiment is configured to an apparatus that heats a raw gas containing silicon tetrachloride and hydrogen and generates a reaction product gas containing trichlorosilane, hydrogen chloride or the like, thereby producing trichlorosilane. As shown in FIG. 1 and FIG. 2, the apparatus includes a reaction vessel 10 to which the raw gas is supplied, and heaters 20 that are provided in the reaction vessel 10 and heat the raw gas. The reaction vessel 10 has a heat insulating container 30 to prevent reduction of heat efficiency by dissipation of heat, (the heat generated by the heaters) from the reaction vessel 10. FIG. 1 shows a cross section of the apparatus for producing trichlorosilane 100 along the line B-B in FIG. 2. In the apparatus for producing trichlorosilane 100, constituent members (parts) which are placed within the vessel and may be in contact with the raw gas are made of carbon.

The carbon members are coated with SiC so as to prevent generation of impurities such as methane or the like.

The reaction vessel 10 comprises a substantially cylindrical wall body 11, a top plate 12 that closes (covers, seals) an upper opening formed by the wall body 11, and a bottom plate 13 that closes an lower opening formed by the wall body 11.

The wall body 11 comprises an inner wall 11A and an outer wall 11B. The inner wall 11A and the outer wall 11B have substantially cylindrical forms and are arranged concentrically. A cylindrical space (cylindrical passage 11a) is formed in the interstices between the inner wall 11A and the outer wall 11B. A lower edge of the outer wall 11B is sealed to be in contact with the bottom plate 13. On the other hand, the inner wall 11A is disposed such that a lower edge of the inner wall 11A is apart from the bottom plate 13. By this constitution, a ring-shaped gas introducing passage 11b is opened beneath the lower edge of the inner wall 11A and communicates the cylindrical passage 11a and an inner space of the inner wall 11A.

A ring-shaped passage 11c communicated to the upper part of the cylindrical passage 11a is provided to the wall body 11. A raw gas supply pipe 14 is connected to the upper part of the ring-shaped passage 11c. A gas discharge pipe 15 through which the reaction product gas is discharged outside the reaction vessel is connected to the reaction vessel 10 such that the gas discharge pipe 15 penetrates a central portion of the top plate 12 that closes the upper end of the wall body 11.

The bottom plate 13 of the reaction vessel 10 is joined to the lower edge of the outer wall 11B to close the lower opening formed by the wall body 11 and supports a plurality of heaters 20. The heaters 20 stand on the bottom plate 13 in an arrangement of concentric plural circles. The top plate 12 of the reaction vessel 10 is joined to the upper ends of the inner wall 11A and outer wall 11B of the wall body 11 to close the upper end of the wall body 11. A space that is enclosed by the top plate 12, wall body 11 (inner wall 11A), and the bottom plate 13 and includes a plurality of heaters 20 standing therein constitutes a reaction chamber 101 of the apparatus for producing trichlorosilane 100.

Each of the plurality of heaters 20 that heat the raw gas in the reaction chamber 101 has a substantially platy heating element 21 that is elongated in the vertical direction and generates heat by resistance heating upon supply of electric power, and a mount 22 that is fixed to the bottom plate 13 and supports the lower end of the heating element 21. In this embodiment, the heaters are arranged on triple concentric circles. The mount is an electrode that supports the heating element and is used to connect the adjacent heaters 20 electrically. A plurality of (e.g., four) heaters 20 may be connected serially through the mounts 22, and plural (for example, seven) series (lines) of the thus connected heaters 20 may be connected in parallel. By supplying electric power from the electrodes (mounts 22) of each series, it is possible to generate resistance heat in each heating element uniformly, thereby heating the raw-gas in the reaction chamber 101.

Figure 3:
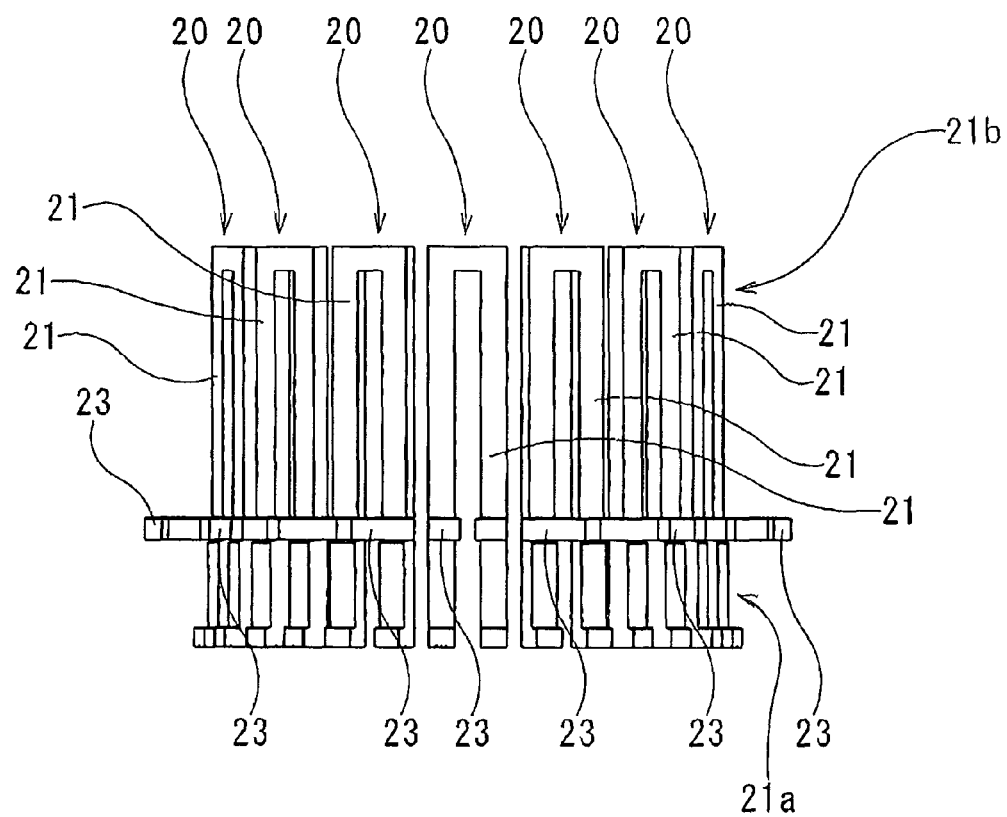
FIG. 3 is a side view of heaters in the apparatus for producing trichlorosilane shown in FIG. 1.

As shown in FIG. 3, a lower portion of each heating element 21 has a small resistance due to large thickness and constitutes a non-exothermic portion 21a where relatively low heat is generated. On the other hand, an upper portion of the heating element 21 has large resistance due to small thickness and constitutes a exothermic portion 21b where high heat is generated. A flange 23 is disposed in the intermediate height of the heating element 21, that is, to a boundary position between the non-exothermic portion 21a and the exothermic portion 21b. The flange 23 is disposed to the position higher than the gas introducing passage 11b and is formed to have arbitrary shape depending on an arrangement of respective heater 20 in the chamber 101. The flanges 23 are arranged with clearances (dispersion passages 102) such that each flange is not in contact with adjacent flange and is not in contact with the inner surface of the inner wall 11A. In this embodiment, the flanges 23 are arranged at a same height constituting a plane of substantially the same level (see FIG. 2 and FIG. 3). Because of the structures of the heaters 20, electric current hardly flows in the flanges 23. Therefore, only small amount of heat is generated in the flanges 23. The thus arranged flanges 23 separate the reaction chamber 101 to a lower space to which the raw gas is introduced and an upper space in which the raw gas is heated. Since the heaters 20 are arranged with close distance leaving small open spaces, additional members (for example, gas dispersing plates) and structures for fixing the members are hardly disposed to the bottom plate 13 on which the mounts 22 are fixed or to the inner surface of the inner wall 11A.

Preferably, flanges 23 are provided such that area of the flanges 23 and the heating elements 21 constitute 70% or more in area fraction of a horizontal cross section of the space in the reaction chamber 101. In the present embodiment, as shown in FIG. 2, intervals (distance) between adjacent flanges are substantially uniform in the whole region in the reaction chamber 101. Alternatively, it is possible to provide the flanges 23 such that the flanges 23 are arranged with small intervals in the outer circular arrangement of the heaters and the flanges 23 are arranged with large intervals in the inner circular arrangement of the heaters so as to flow the gas more uniformly.

In the above-described apparatus for producing trichlorosilane 100, the raw gas supplied through the raw gas supply pipe 14 into the reaction vessel 10 is filled in the ring-shaped passage 11c, and is subsequently introduced to the cylindrical passage 11a. The gas introduced to the cylindrical passage 11a is introduced into the lower portion of the reaction chamber 101 through the gas introducing passage 11b.

The raw gas introduced into the reaction chamber 101 is saturated (filled) in the space below the flanges 23 due to disturbance to the gas flow, flows upward through the dispersing passage 102. Upward flow of the raw gas is controlled while passing the dispersing passages 102, and the gas that has passed through the dispersing passages 102 is dispersed in the upper space in the reaction chamber, and is heated uniformly by the exothermic portions 21b of the heating elements 21. The reaction product gas generated by conversion of the raw gas heated by the heaters 20 is discharged from the apparatus for producing trichlorosilane 100 through the gas discharging passage 15.

As explained above, in the apparatus for producing trichlorosilane 100, it is possible to heat the raw gas with high heat efficiency since the heaters 20 are disposed inside the reaction chamber 101, and the heat from the heaters 20 is transferred directly to the raw gas flowing (circulating) around the heaters. Since the heaters 20 are arranged inside the reaction chamber 20, it is possible to dispose the heaters at appropriate positions depending on the size of the reaction vessel 10. Therefore, it is possible to avoid reduction of heat efficiency even when the reaction vessel is made to have a large size.

In the above-described apparatus for producing trichlorosilane 100, heaters 20 each having the heating element 20 provided with a flange are arrayed in a plurality of lines. By this constitution, interstitial spaces between each heating elements 21 are narrowed by flanges 23, and the narrowed spaces constitute a passage 102 of raw gas. Since the flow of raw gas is controlled by the flanges 23, it is possible to flow (circulate) the raw gas uniformly from the lower space to the upper space in the reaction vessel 10. By this constitution, the total amount of the raw gas is heated uniformly by the heating element 21 of the each heater 20. As a result, it is possible to prevent reduction of reaction efficiency or the like due to heterogeneous heating. Since the flanges 23 are disposed to the boundary portions between the non-exothermic portions 21a and exothermic portions 21b of the heaters 20, the raw gas flows in the vicinity of the exothermic portion 21b is in a controlled state as a result of flow control by the flanges 23. Therefore, it is possible to heat the raw gas with a high heat efficiency.

Since large numbers of heaters 20 stands in a close arrangement on the bottom plate 12 of the reaction vessel 10 in the above-described apparatus for producing trichlorosilane 100, it is difficult to dispose additional members such as a dispersing plate in the reaction vessel 10. However, since the flanges 23 disposed to the heating elements 21 of the heaters 20 function as dispersing plates, it is possible to disperse the gas effectively while avoiding disposition of additional dispersing plates.

Figure 4:
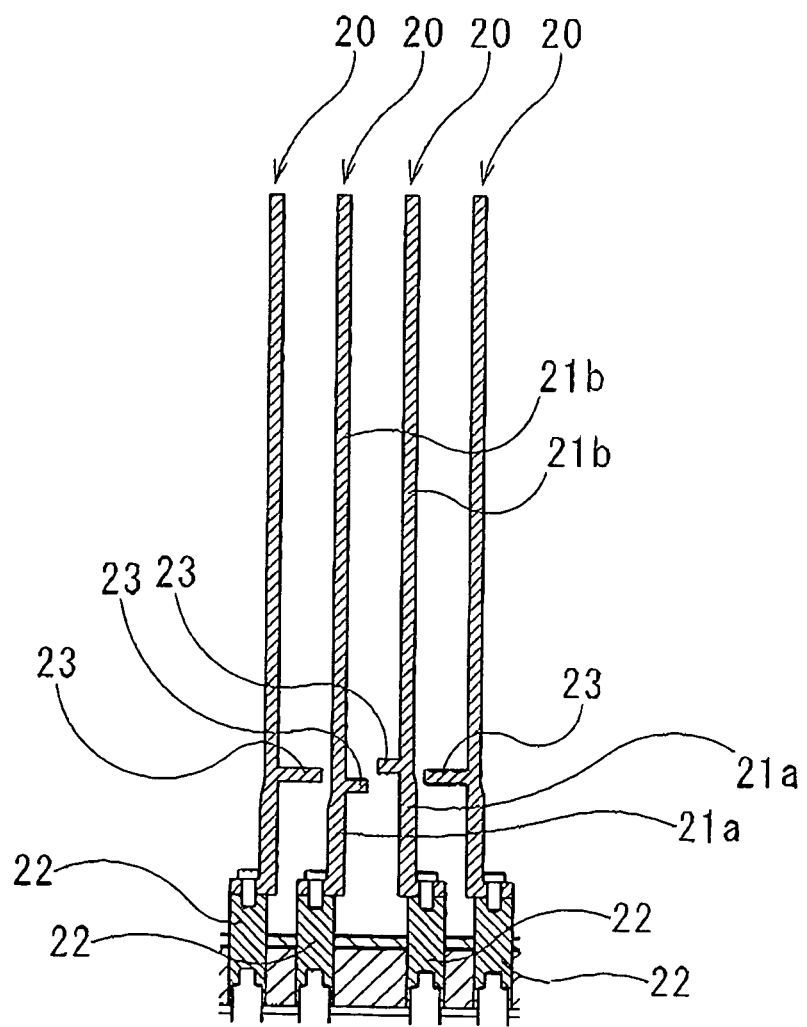
FIG. 4 is a vertical cross-sectional view of heaters according to an embodiment of an apparatus for producing trichlorosilane of the present invention.

The present invention is not limited to the constitution of the above-described embodiment. The constitution of the apparatus may be modified in various ways within the scope of the present invention. For example, while the flanges are arranged at the same level in the above-described embodiment, flanges 23 in adjacent heating elements 21 may be positioned at different heights as shown in FIG. 4. In this case, it is easy to prevent the contact between flanges 23 thereby preventing short circuit between adjacent heaters.

Figure 5:
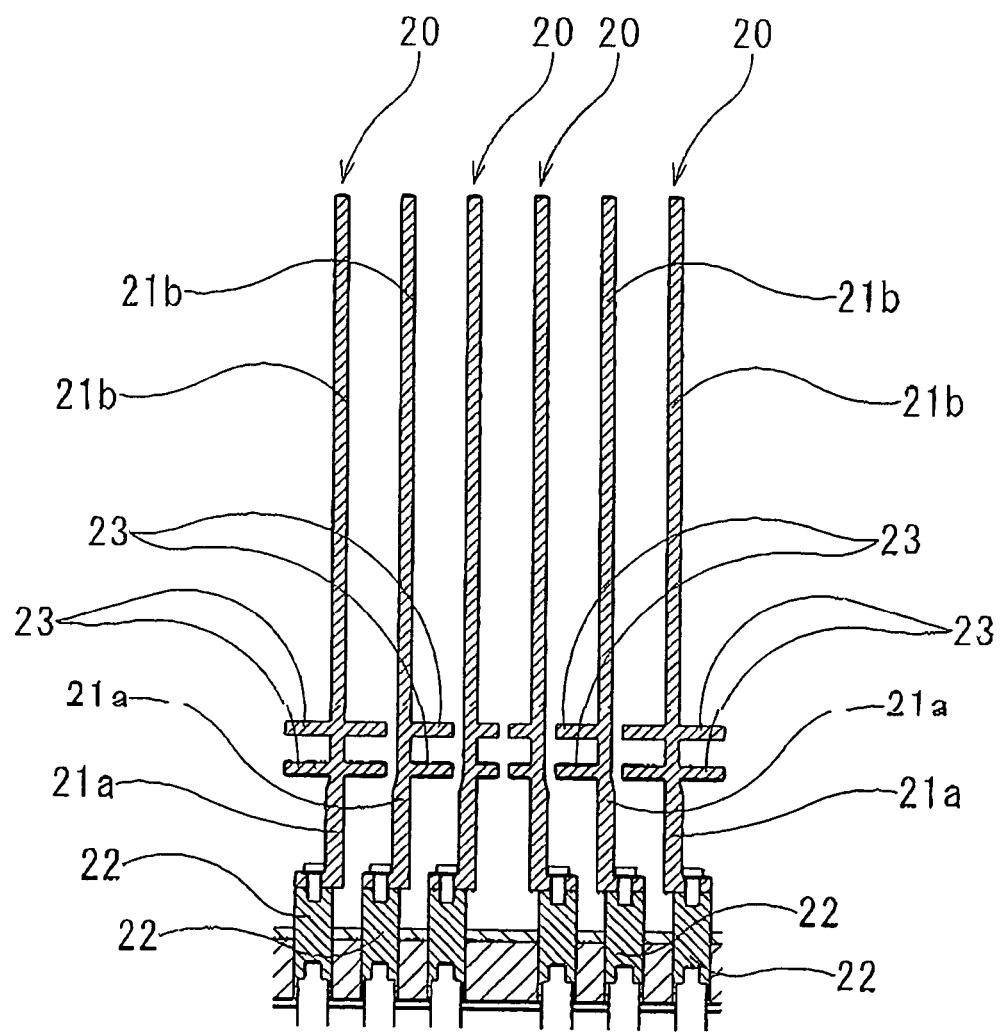
FIG. 5 is a vertical cross-sectional view of heaters according to another embodiment of an apparatus for producing trichlorosilane of the present invention.
Figure 6:
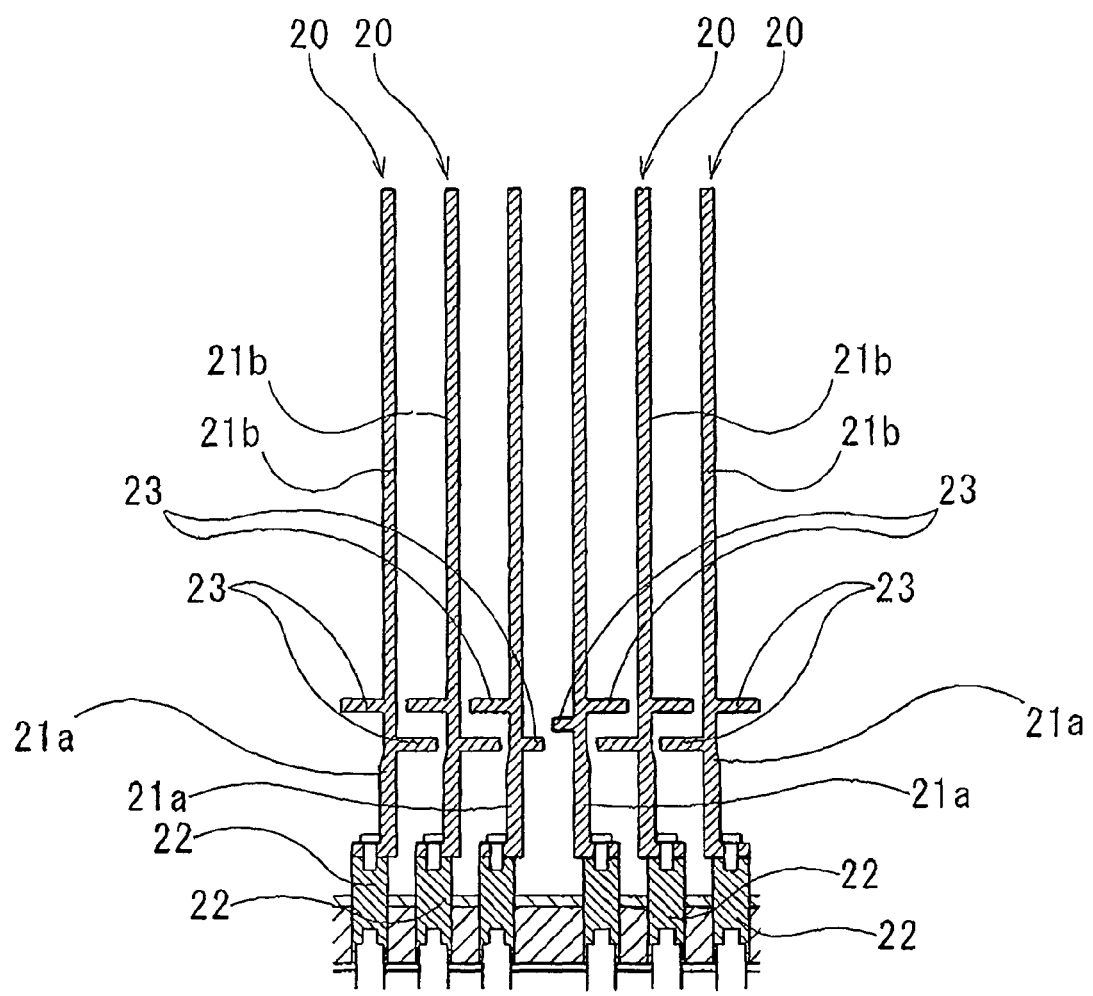
FIG. 6 is a vertical cross-sectional view of heaters according to still other embodiment of an apparatus for producing trichlorosilane of the present invention.

As shown in FIG. 5, a plurality of flanges 23 may be disposed to each of the heating elements 21 to achieve an improved flow controlling effect. Further, the heights of the flanges 23 may be different between adjacent heating elements 21 as shown in FIG. 6. In this case, it is possible to achieve a high heat controlling effect while avoiding short circuit between heaters 20 caused by contact between adjacent flanges 23.

Where the flanges 23 are arranged at a plurality of heights (levels) as shown in FIG. 4, FIG. 5, and FIG. 6, it is preferable to dispose the flanges 23 such that area fraction of the heaters 21 and flanges 23 constitute 70% or more in a cross section of a space inside the reaction chamber 101 at one of the heights.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. An apparatus for producing trichlorosilane from a raw gas that includes silicon tetrachloride and hydrogen, comprising:

a reaction vessel that has a substantially cylindrical wall body, a top plate that closes an upper opening formed by the wall body, and a bottom plate that closes a lower opening formed by the wall body, where a reaction product gas is produced from the raw gas supplied through a gas introducing passage provided to the lower section of the cylindrical wall body; and a plurality of heaters that are disposed inside the reaction vessel to heat the raw gas, wherein each of the heaters has a heating element that is elongated in vertical direction and generates heat upon electrification, and a mount that is fixed to the bottom plate and supports the heating element;

a flange is provided to an intermediate height of the heating element such that the flange is arranged to a position higher than the gas introducing passage and is elongated in horizontal direction; and a passage of the raw gas formed between adjacent heaters is narrowed by the flange.

2. The apparatus for producing trichlorosilane according to claim 1, wherein each of the heating elements has a non-exothermic portion provided in a lower portion of the heating element and an exothermic portion provided in an upper portion of the heating element, wherein heat generated in the non-exothermic portion is smaller than heat generated in the exothermic portion, and the flange is disposed to a position lower than the exothermic portion.

3. The apparatus for producing trichlorosilane according to claim 2, wherein the flange is provided to a boundary portion between the non-exothermic portion and the exothermic portion of each of the heating element.

4. The apparatus for producing trichlorosilane according to claim 1, wherein a height of the flange of each of the heating elements is different from a height of the flange of an adjacent heating element.

5. The apparatus for producing trichlorosilane according to claim 1, wherein each of the heating elements has a plurality of flanges at different heights.

6. The apparatus for producing trichlorosilane according to claim 5, wherein heights of the flanges of each of the heating elements are different from heights of the flanges of an adjacent heating element.

7. The apparatus for producing trichlorosilane according to claim 2, wherein a height of the flange of each of the heating elements is different from a height of the flange of an adjacent heating element.

8. The apparatus for producing trichlorosilane according to claim 3, wherein a height of the flange of each of the heating elements is different from a height of the flange of an adjacent heating element.

* * * * *